UNITED STATES PATENT OFFICE.

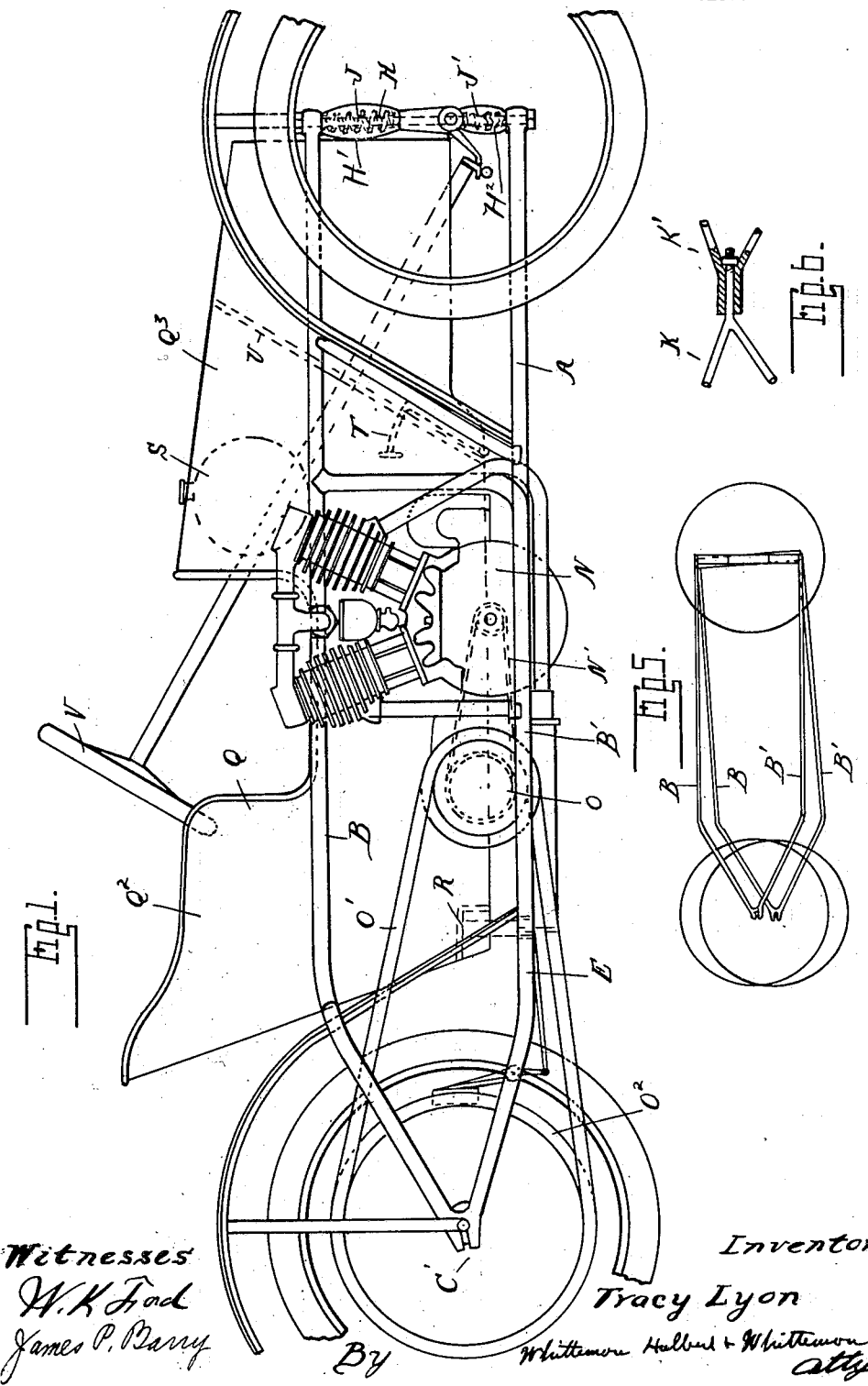

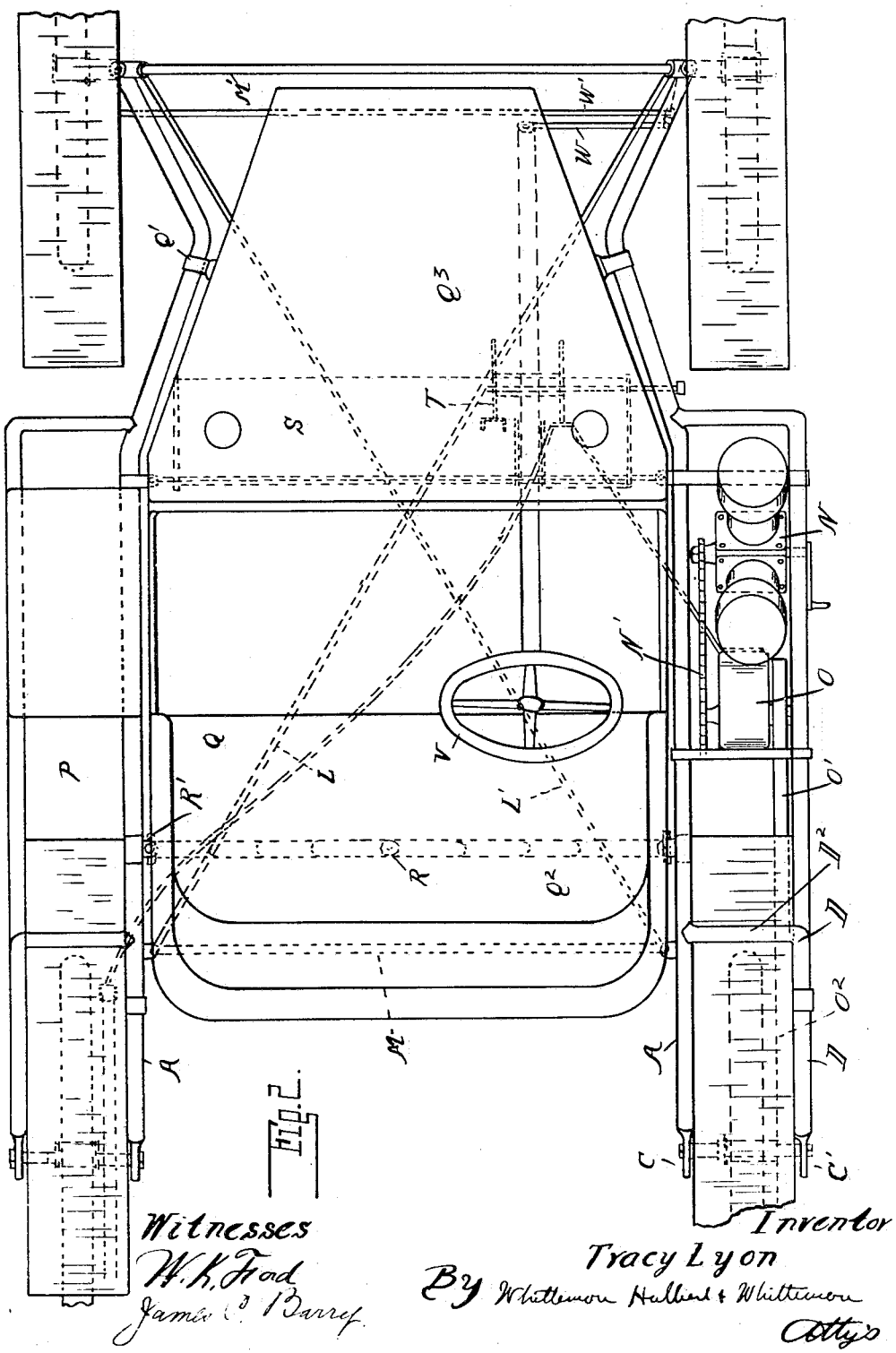

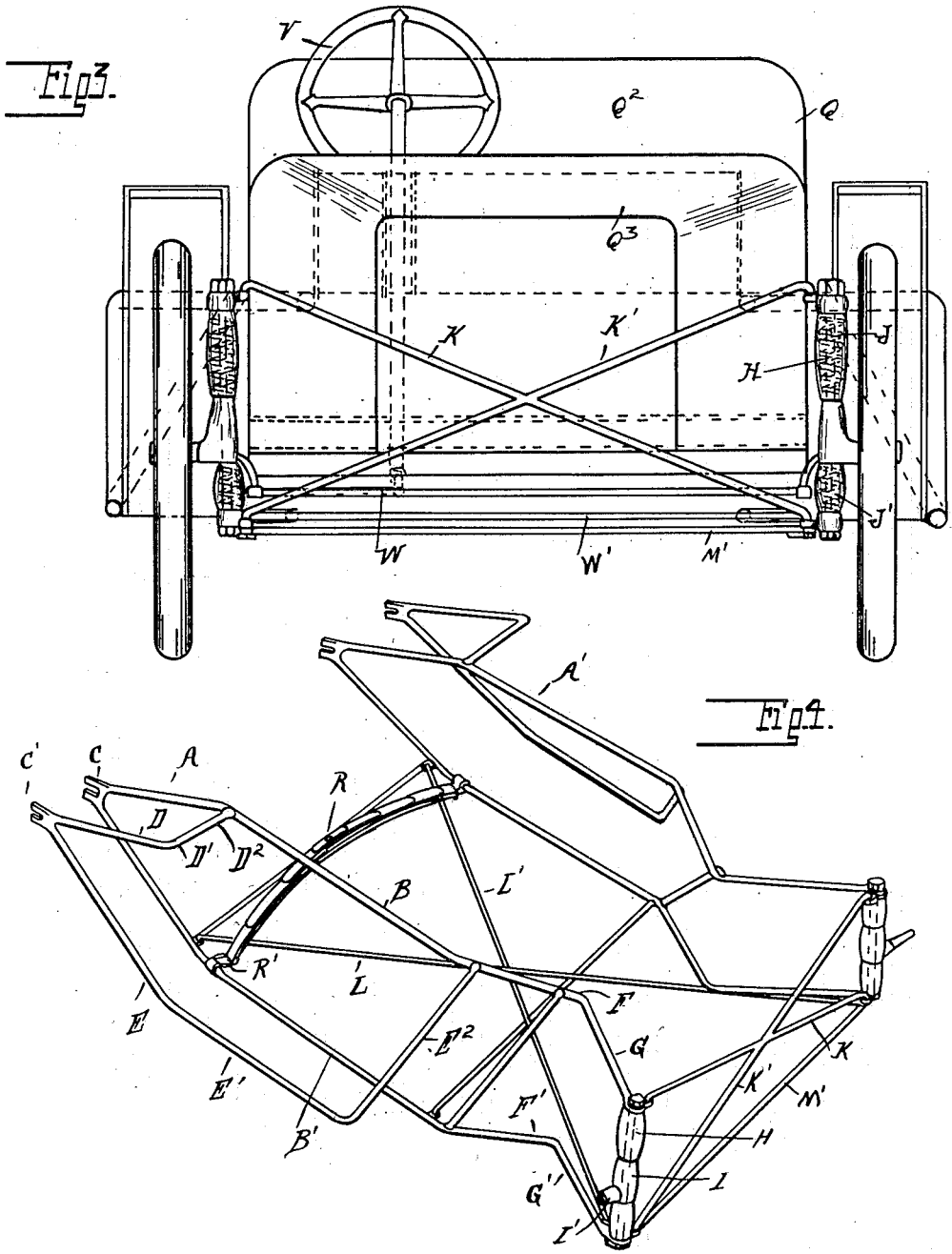

TRACY LYON, OF DETROIT, MICHIGAN, ASSIGNOR, BY MESNE ASSIGNMENTS, TO MOTOR PRODUCTS COMPANY, OF DETROIT, MICHIGAN, A CORPORATION OF MICHIGAN.

MOTOR-VEHICLE.

1,121,193.  Specification of Letters Patent.  Patented Dec. 15, 1914.

Application filed September 19, 1913. Serial No. 790,755.

*To all whom it may concern:*

Be it known that I, TRACY LYON, a citizen of the United States of America, residing at Detroit, in the county of Wayne and State of Michigan, have invented certain new and useful Improvements in Motor-Vehicles, of which the following is a specification, reference being had therein to the accompanying drawings.

The invention relates to motor vehicles and has for its principal objects reduction in weight, simplification in construction and diminution in cost of manufacturing and maintenance. These objects are attained by a reorganized construction in which many of the parts commonly used in motor car construction are dispensed with.

The invention also comprises various novel features of construction as hereinafter set forth.

In the drawings: Figure 1 is a side elevation, Fig. 2 is a plan and Fig. 3 is an end elevation of my improved construction of car; Fig. 4 is a perspective view of the frame; Fig. 5 is a diagrammatic side elevation illustrating the manner in which the frame is permitted to warp or flex; and Fig. 6 is a view similar to a portion of Fig. 3, showing a modified construction.

Generally described, my improved construction comprises two symmetrical frames extending between the front and rear wheels on opposite sides of the car, and preferably formed of tubular construction. These frames are cross-connected by tie members which maintain said frames in parallel vertical planes, but which nevertheless permit of more or less weaving or independent movement of the frames on opposite sides. One of the frames has mounted thereon a motor with transmission mechanism between the same and the rear or driving wheel, while the other frame is motorless. Thus the vehicle is driven solely by the one driving wheel, but as four wheels are employed it has all of the stability of a standard automobile. The body is mounted between the side frames and the control mechanism is located in a convenient position for operation.

In more specific construction, A and A' are the two side frames, each of which is preferably formed of parallel upper and lower longitudinal bars B and B', which at their rear ends converge to form a support, C, on one side of the rear wheel. Upon the opposite side of the wheel is a similar support, C', formed of an upper member, D, which is bent at D' to form a transversely extending bar $D^2$ connected to the upper bar of the main frame. The lower bar, E, of the support C' has a portion E' parallel to and in the horizontal plane of the lower bar B', while at the end of this portion E' the bar is bent to form a portion $E^2$ extending obliquely to the upper bar B and connected therewith. Forward of the portions B and B' are inwardly-bent portions F F', which are re-bent to extend outwardly in the portions G and G', said portions F and F' and G and G' being parallel to each other. The outer ends of the portions G and G' are vertically connected by a rod or pin, H, upon which is sleeved the knuckle I of the steering-wheel stub-axle I', while above and below this knuckle are buffer springs, J and J', also sleeved upon the rod H and covered by flexible coverings H' and $H^2$ respectively. The construction is such that the inward bend of the portion F will provide sufficient clearance for the maximum turning of the steering wheel mounted upon the stub-axle I', while the sleeve I and buffer springs J and J' will yieldably and resiliently support the frame upon said wheel.

As thus far described, the frames upon opposite sides of the machine are the same, being only reversed from right to left and thereby forming a symmetrical construction. The cross connections between these frames are preferably formed by diagonal cross-bars K and K', the outer ends of which are attached adjacent to the outer ends of the bars G G'. In addition to this cross connection there are preferably diagonal cross braces L and L' arranged in the horizontal plane of the lower frame members B', and further, there are tie members, M and M', which are perpendicular to the side frames and serve to properly space the same. The whole construction of cross connection is such that the rectangularity of the frame in plan view is constantly maintained, but, by reason of the flexibility of these cross connections, the side frames A and A' are permitted to move vertically, independently of each other, thereby conforming to an uneven road-bed.

The side frame A has mounted thereon the motor, N, which may be of any suitable construction, and also the vertical speed transmission O. These parts are mounted upon the parallel lower bars B' and E' and their casings or supports form cross-ties between said bars. The transmission connections are preferably a sprocket-and-chain connection, N', between the motor and the variable speed transmission and a belt connection, O', between the latter and the drive pulley, $O^2$, connected with the rear or driving wheel. On the opposite frame A', having neither motor nor transmission, the bars B' and E' may be used for supporting a step or running-board, P; this also acting as a brace between bars.

The car body Q is supported upon the frames, preferably by a three-point suspension. The forward support is upon pins or connections, Q', with the bars F', preferably adjacent to the bend connecting said bars with the portions G. At the rear the body is supported, preferably on a single point upon the rear supporting spring, R, which extends transversely between the frames and is connected therewith with shackles R'. The body is preferably provided with a single seat $Q^2$ which will accommodate two persons, and in its front portion there is an extension, $Q^3$, which simulates the appearance of the usual engine hood in automobile construction. In the rear and upper portion of this hood a transversely-extending fuel tank, S, may be placed, while beneath this tank is a space for the feet of the operator and for the location of the pedal control levers, T, which are mounted upon one frame and project through the inclined foot-board U. This foot-board divides the space within the hood and the forward space may be utilized for storage of anything to be carried.

V is the steering-wheel which is located in front of the seat, $Q^2$, the stem extending through the hood $Q^3$ and being mounted thereon. At its lower end this stem is connected by a rock-arm and link connection, W, with one of the steering-knuckles and by a cross connection, W', with the other knuckle.

With the construction as described the weight may be reduced to the minimum, as many parts—such as the axles, the differential compensating gearing, etc., which are used upon automobiles—have been dispensed with. The frame is strongly braced to maintain its rectangularity, but when traveling over rough roads the two side frames are free to move independently of each other, either by the flexing of the cross-members K K' or, if desired, by the provision of a swivel connection between the two sides of the frame, as shown in the modification in Fig. 6. There may also be provision for universal play or pivoting between the ends of the brace-rods and ties L and M and between the side-frame and the shackles supporting the spring R as shown in Fig. 3, where the brace rods are shown as terminating in arc portions slidably fitting eyes in the frames. Such connections will give great flexibility to the frame without impairing its strength, while the three-point suspension of the body on the frame permits of such flexing with a minimum displacement of the body.

It will be observed that the body at its forward end is non-yieldably attached to the frame, while at its rear end it is supported upon a spring. On the other hand, the rear end of the frame is non-yieldably supported upon the ground wheels, while the forward end of the frame is resiliently supported upon the ground wheels through the medium of the slidable sleeve I and buffer spring J and J'. This gives a very easy riding construction, while the independent yieldability of the forward or steering wheels facilitates the mounting of the car over obstructions.

The arrangement of the parallel, inward-bent frame members F F' with their outwardly-bent portions G G' provides all the required clearance for the steering wheels, and, at the same time, form a strong connection between the frame and said wheels.

For convenience in shipment or storage, it is desirable to collapse the frame so as to decrease the width thereof. This is preferably accomplished with my improved construction by providing a detachable connection between the horizontal diagonal braces L and L' and one of the frames, and also providing a detachable connection between the body and the frame. This permits of first detaching the body and then, after disengaging the braces L and L', the frames may be moved angularly with a parallelogram movement, advancing one beyond the other and decreasing the width of the space therebetween.

What I claim as my invention is:

1. A motor vehicle, comprising two symmetrical side frames upon the forward and rear wheels, flexible connections between said frames giving independent vertical movement thereof, while maintaining the parallelism and rectangularity in a horizontal plane, and a motor mounted on one of said frames operatively connected with the drive wheel thereof.

2. In a motor vehicle, two side frames, each provided with a rear wheel and a steering wheel, cross connections between said frames permitting of independent vertical adjustment but maintaining horizontal rectangularity and parallelism, a body mounted between said frames, a motor upon one of said frames operatively connected to its drive wheel, and control mechanism for said motor mounted upon said body.

3. In a motor vehicle, four wheels, two symmetrical side frames mounted upon and connecting the longitudinally alined wheels, each of said frames being inwardly bent in its forward portion to provide clearance for the turning of its forward wheel, cross connections between said frames maintaining the parallelism thereof, and a motor mounted on one of said frames operatively connected with the rear wheel thereof.

4. A motor vehicle, comprising four independent wheels, two symmetrical side frames respectively mounted upon and connecting the longitudinally alined wheels, the forward portions of said frames being inwardly bent to provide angular clearance for the wheels thereof, cross connections between said frames maintaining the parallelism thereof, a motor mounted on one of said frames operatively connected with the rear wheel thereof, a body supported on said frames, steering mechanism mounted on said body connected to simultaneously control both of the forward wheels, and control mechanism also mounted on said body operatively connected with said motor.

5. In a motor vehicle, four independent wheels, two symmetrical side frames mounted upon and connecting the longitudinally alined wheels, said frames being inwardly bent in their forward portions to provide angular clearance for the wheels, cross connections between said frames maintaining the parallelism thereof while permitting a limited freedom of independent vertical movement, a body suspended from said frames between the same, steering mechanism mounted on said body operatively connected to the forward wheels of said frames, a motor mounted on one of said frames operatively connected to the rear wheel thereof.

6. In a motor vehicle, four independent wheels, two side frames respectively connecting pairs of longitudinally alined wheels, the rear ends of said frames being directly mounted on the axles of the rear wheels, steering knuckles for the forward wheels vertically, slidably connected to the forward ends of said frame, means for resiliently supporting said frames upon said knuckles, and cross connections between said frames for maintaining the parallelism thereof.

7. A motor vehicle, comprising four independent wheels, two side frames respectively connecting the pairs of longitudinally alined wheels, the rear end of each frame being directly mounted on the axle of the rear wheel and the forward end being laterally inwardly deflected to provide clearance for the turning of the forward wheel, a knuckle for turning each forward wheel vertically, slidably connected to the forward end of the frame, means for resiliently supporting said frame upon said knuckle, cross connections between said frames for maintaining the parallelism thereof, a body mounted upon and between said frames, and a steering mechanism operable from said body connected with the knuckle of each forward wheel.

8. A motor vehicle, comprising four independent wheels, two side frames respectively connecting the pairs of longitudinally alined wheels, said frames being provided with inwardly-extending return-bent portions near their forward ends providing angular clearance for the forward wheels, steering knuckles for the forward wheels vertically, slidably connected to the forward ends of said frames, means for resiliently mounting said frames upon said knuckles, a connection between said frames for maintaining the forward portions thereof in lateral alinement, and connections between the rear portions of said frames maintaining longitudinal parallelism thereof and permitting independent vertical movement.

9. In a motor vehicle, a side frame comprising parallel upper and lower longitudinal bars having converging portions at their rear ends forming a fork for engaging the rear wheel axle, their forward portions being bent inward to provide wheel clearance, a vertical rod connecting the forward ends of said bars, a steering knuckle sleeved upon said rod, and a buffer spring also sleeved upon said rod and engaging said knuckle.

10. In a motor vehicle, a side frame comprising upper and lower parallel rods provided with converging rear portions forming a fork for engaging the rear wheel axle, a parallel fork having the inward end portions of its bars bent laterally and connected to said upper bar, and a motor and transmission mounted on the lower bars of said forks and constituting a tie connection therebetween.

11. In a motor vehicle, a side frame, comprising parallel upper and lower bars having converging end portions forming a fork, a parallel fork having its lower bar extending in the horizontal plane of the lower bar of the first fork, with its forward end portion bent obliquely to connect with said upper bar, and a motor and transmission mounted on said lower bars.

12. In a motor vehicle, a side frame comprising parallel bars in the same vertical plane, having converging rear portions forming a fork, and their forward portions being bent inward and outward to provide wheel clearance, a fork parallel to said first-mentioned fork and having its upper and lower bars both connected to the upper bar of the main fork, and a motor and transmission mechanism connected to the lower bars of said forks.

13. In a motor vehicle, a side frame comprising parallel upper and lower bars in the same vertical plane having converging rear end portions forming a fork, a fork having converging portions parallel to those of the first-mentioned fork, the upper bar thereof being bent laterally and connected to the upper parallel bar and the lower bar being extended in the horizontal plane of the lower bar of said parallel bars and terminating in an oblique portion connected to the upper of said parallel bars, a drive wheel mounted between said forks, and a motor having transmission connection with said drive wheel mounted upon said lower bars and forming a cross tie between the same.

14. A motor vehicle, comprising four independent wheels, two symmetrical side frames respectively mounted on the pairs of wheels in longitudinal alinement, each frame being formed of parallel bars in the same vertical plane, having converging rear portions forming a fork on one side of the rear wheel, the forward portions of said bars being bent inward and outward to provide angular clearance for the forward wheel, a rod connecting the forward ends of said bars, a steering knuckle sleeved upon said rod, a buffer spring for supporting said knuckle, a fork parallel to said rear fork on the opposite side of said rear wheel, having its upper member bent laterally to connect with the upper of said parallel bars and its lower member being extended in the horizontal plane of the lower of said parallel bars and then bent to form oblique portions connecting with the upper of said bars, a motor mounted on the lower parallel bars to one of said frames having a drive connection with said rear wheel, and a running-board mounted on said bars of the other frame.

15. In a motor vehicle, a side frame having a rear portion bifurcated to embrace the rear wheel and forming a mounting for the motor, the forward portion of said frame being formed of parallel bars in the same vertical plane on the inner side of said bifurcated portion, said bars being bent inward and outward to provide angular clearance for the forward wheel, a rod connecting the forward ends of said bars, and a steering wheel knuckle sleeved upon said rod and resiliently supported thereon.

16. A motor vehicle, comprising four independent wheels, two side frames connecting the pairs of longitudinally alined wheels, each side frame comprising a bifurcated rear portion for embracing the rear wheel and a forward portion on the inner side of said bifurcated portion bent inward and outward to provide clearance for the forward wheel, a vertical rod connecting the forward ends of said forward portion, a steering knuckle sleeved upon said rod, and buffer springs for said knuckle also sleeved upon said rod.

17. A motor vehicle, comprising four independent wheels, two side frames connecting the pairs of longitudinally alined wheels and mounted thereon, cross connections between said side frames holding the same in parallelism, and detachable brace connections maintaining said side and cross connections horizontally normally rectangular, but permitting when detached the angular movement in a horizontal plane of said cross connections to decrease the space between said side frames.

18. A motor vehicle, comprising four independent wheels, and a normally rectangular frame connecting and mounted upon said wheels, said frame being capable of angular parallelogram adjustment in a horizontal plane for collapsing and decreasing the width thereof.

19. A motor vehicle, comprising four independent wheels, two parallel side frames connecting and mounted upon said wheels, cross connections between said frames for maintaining the same parallel and normally rectangular, one or more of said connections being detachable to permit the parallelogram collapsing of said frame in a horizontal plane.

20. A motor vehicle, comprising four independent wheels, two parallel side frames connecting and mounted upon said wheels, a bracing cross connection between said frames holding the same in parallel vertical planes with one point in each frame in constant horizontal alinement, said connection permitting the flexing of the frame about the point of horizontal alinement and independent vertical movement of other points in said frame.

21. A motor vehicle, comprising four independent wheels, two side frames connecting and mounted upon said wheels, connections between said frames maintaining the same parallel while permitting independent vertical movement, and a second connection between said frames for holding them in vertical planes with one point in each in constant horizontal alinement.

22. A motor vehicle, comprising four independent wheels, two parallel side frames connecting and mounted upon said wheels, link connections between said frames maintaining the spacing thereof, diagonal braces in the horizontal plane normally holding said frame rectangular, and diagonal braces in a vertical plane holding said side frames in vertical planes with opposite points in constant horizontal alinement, said diagonal braces in a vertical plane permitting of torsional movement for the independent vertical adjustment of said side frames.

23. A motor vehicle, comprising four independent wheels, a frame resiliently supported upon two of said wheels and rigidly connected to the other two wheels, a spring connected to the portion rigidly connected to the two wheels, and a body connected to said spring at one point and to the portion of the frame resiliently supported upon the wheels.

24. A motor vehicle, comprising two side-frames, wheels upon which said frames are mounted, and cross-connections between said frames terminating in arc portions slidably engaging said frames.

In testimony whereof, I affix my signature in presence of two witnesses.

TRACY LYON.

Witnesses:
 JAMES T. SHAW,
 W. W. MILLER.